(12) United States Patent
Yhann

(10) Patent No.: US 6,639,593 B1
(45) Date of Patent: Oct. 28, 2003

(54) CONVERTING BITMAP OBJECTS TO POLYGONS

(75) Inventor: Stephan R. Yhann, Seattle, WA (US)

(73) Assignee: Adobe Systems, Incorporated, San Jose, CA (US)

( * ) Notice: Subject to any disclaimer, the term of this patent is extended or adjusted under 35 U.S.C. 154(b) by 0 days.

(21) Appl. No.: 09/127,583

(22) Filed: Jul. 31, 1998

(51) Int. Cl.⁷ .............................................. G06T 15/00
(52) U.S. Cl. ...................... 345/419; 382/197; 382/202
(58) Field of Search ................................. 345/419, 441, 345/422; 382/199, 197, 202, 203, 164–167

(56) References Cited

U.S. PATENT DOCUMENTS

| | | | |
|---|---|---|---|
| 5,081,689 A | * 1/1992 | Meyer et al. | 382/22 |
| 5,313,570 A | * 5/1994 | Dermer et al. | 345/589 |
| 5,398,292 A | * 3/1995 | Aoyama | 382/22 |
| 5,504,847 A | * 4/1996 | Kimura et al. | 345/420 |
| 5,528,737 A | * 6/1996 | Sfarti | 345/441 |
| 5,625,768 A | * 4/1997 | Dye | 345/441 |
| 5,661,824 A | * 8/1997 | Allebach et al. | 345/428 |
| 5,684,509 A | * 11/1997 | Hatanaka et al. | 345/615 |
| 5,757,382 A | * 5/1998 | Lee | 345/441 |
| 5,767,857 A | * 6/1998 | Neely | 345/427 |
| 5,790,269 A | * 8/1998 | Masaki et al. | 358/447 |
| 5,832,115 A | * 11/1998 | Rosenberg | 382/199 |
| 5,881,175 A | * 3/1999 | Kim | 382/242 |
| 5,912,991 A | * 6/1999 | Jeon et al. | 382/242 |
| 5,943,441 A | * 8/1999 | Michael | 382/199 |
| 5,966,134 A | * 10/1999 | Arias | 345/589 |
| 6,075,881 A | * 6/2000 | Foster et al. | 382/141 |

OTHER PUBLICATIONS

Theo Pavlidis, "Algorithms for Graphics and Image Processing," Computer Science Press, 1982, pp. 142–148.

* cited by examiner

Primary Examiner—Cliff N. Vo
Assistant Examiner—Huedung X Cao
(74) Attorney, Agent, or Firm—Fish & Richardson P.C.

(57) ABSTRACT

Methods, and apparatus implementing the methods, that provide useful resolution-independent representations of the perimeter of a bitmap object. The methods find the boundary pixels in a bitmap and identify each boundary pixel edge that actually contributes to the object perimeter. The methods distinguish objects that appear to share a common edge because they share boundary pixels, when in fact the objects are separated by a pixel width. The polygon can be encoded in a digital, compact, compressible format, and can be used to define traps in a vector-based trapping environment. A finite state machine for generating the polygon is disclosed. A bitmap object is encode by calculating a sequence of direction codes based on tracing around the bitmap object along the boundary, where each direction code represents a direction from an eight-connected pixel to an adjacent eight-connected pixel. In another aspect, the invention provides a technique for trapping mixed bitmap and vector objects in a vector-based trapping process. The bitmap objects on a page are converted to perimeter polygons, the polygons are planarized with the vector objects of the page, and the resulting planar structures are trapped.

17 Claims, 4 Drawing Sheets

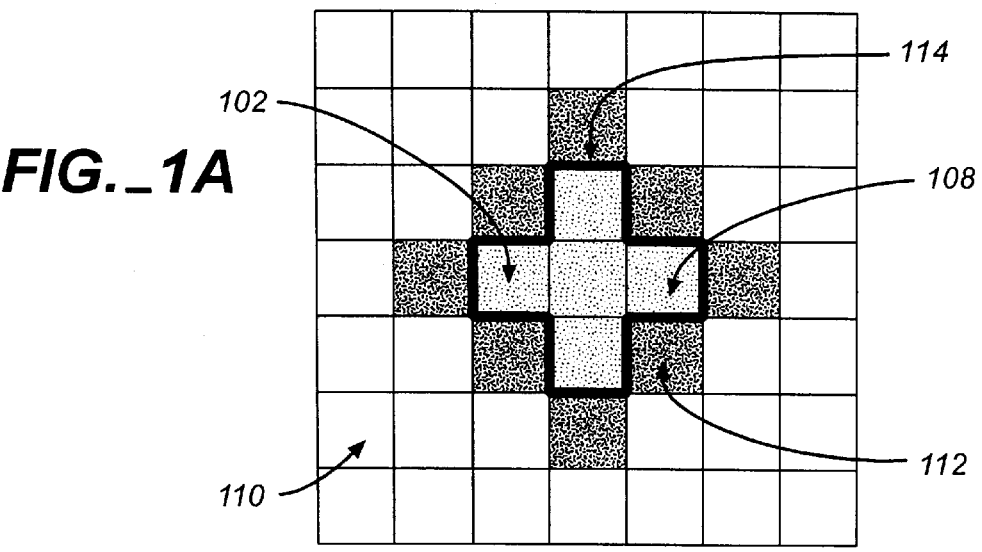
FIG._1A
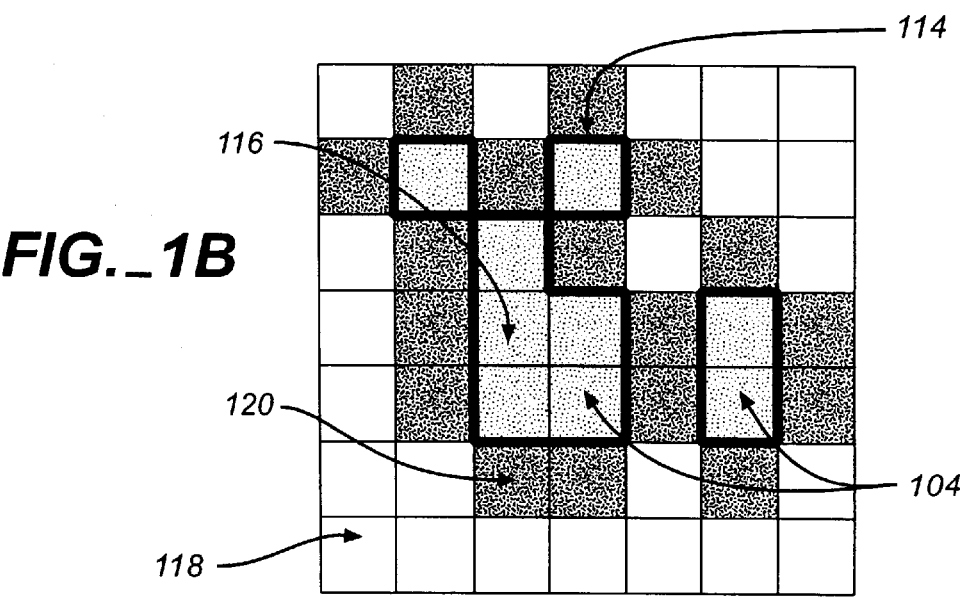
FIG._1B
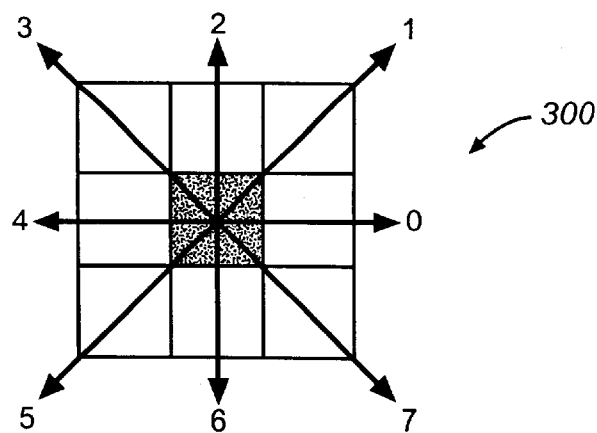
FIG._3

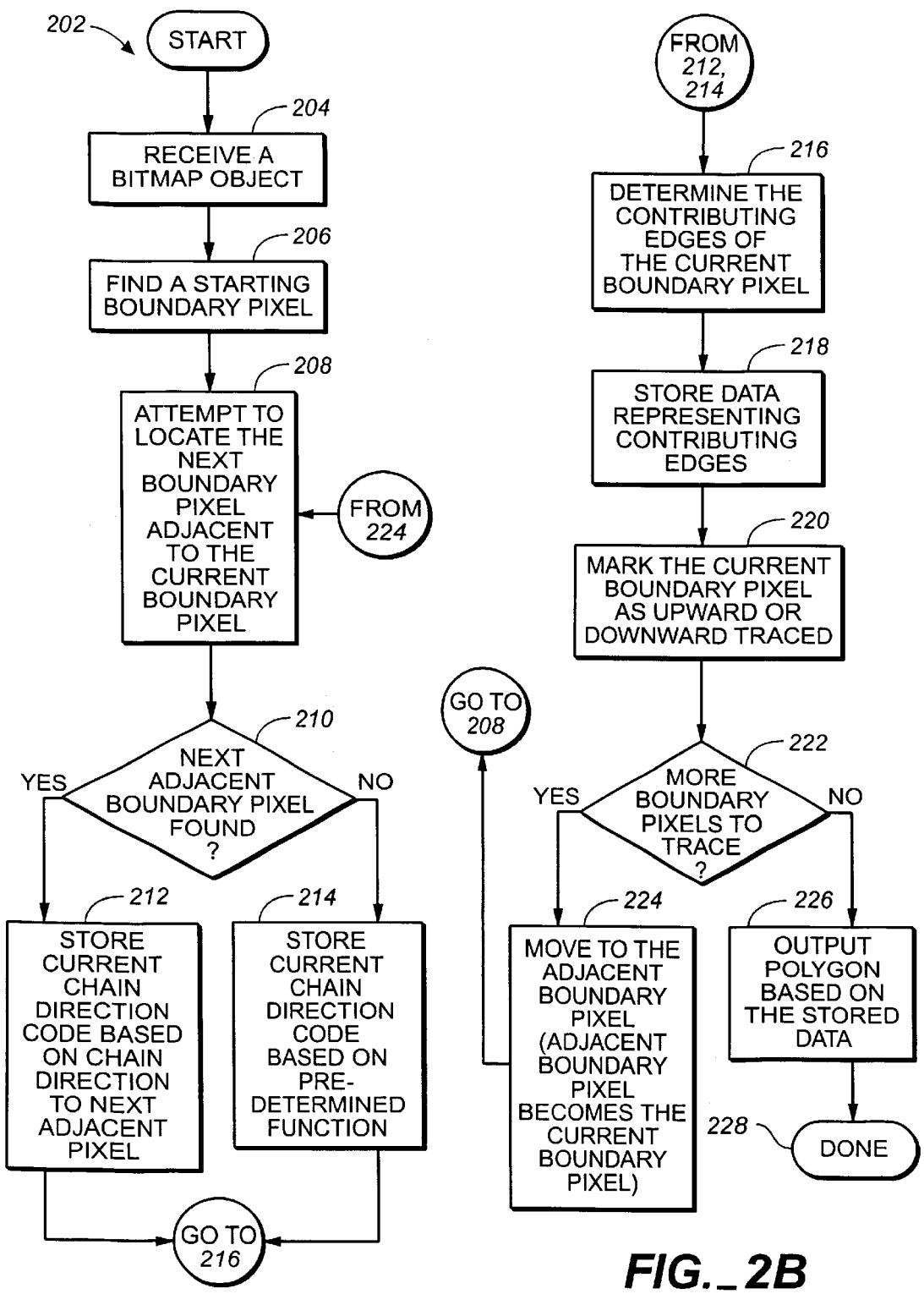
FIG._2A  FIG._2B

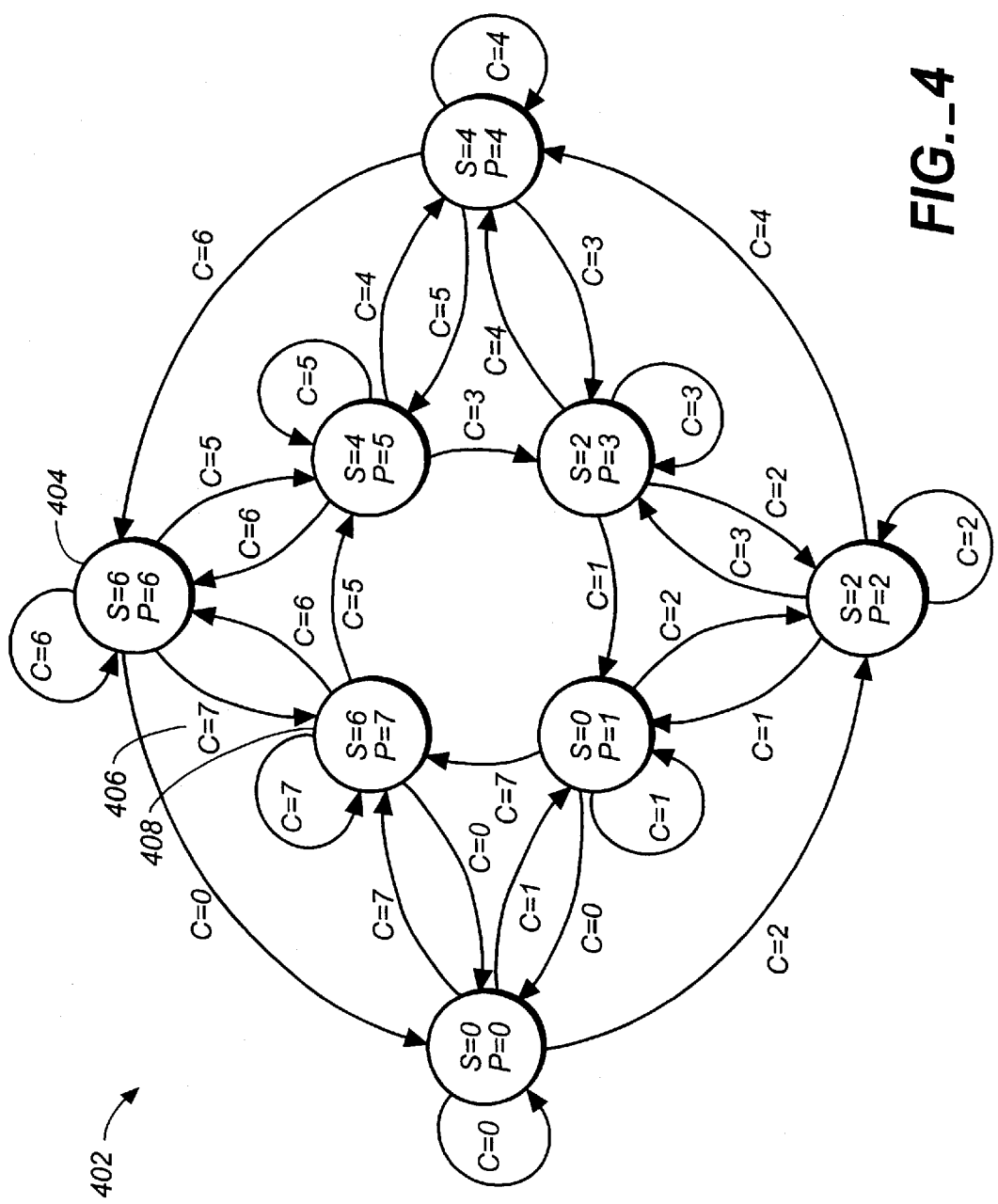
FIG._4

| B\A | C = 0 | C = 1 | C = 2 | C = 3 | C = 4 | C = 5 | C = 6 | C = 7 |
|---|---|---|---|---|---|---|---|---|
| $q = (0,0)$ | X | Y,X | Y | | | | | -Y |
| $q = (0,1)$ | X | Y,X | Y | | | | | -Y |
| $q = (2,2)$ | | X | Y | -X,Y | -X | | | |
| $q = (2,3)$ | | X | Y | -X,Y | -X | | | |
| $q = (4,4)$ | | | | Y | -X | -Y,-X | -Y | |
| $q = (4,5)$ | | | | Y | -X | -Y,-X | -Y | |
| $q = (6,6)$ | X | | | | | -X | -Y | X,-Y |
| $q = (6,7)$ | X | | | | | -X | -Y | X,-Y |
FIG._5
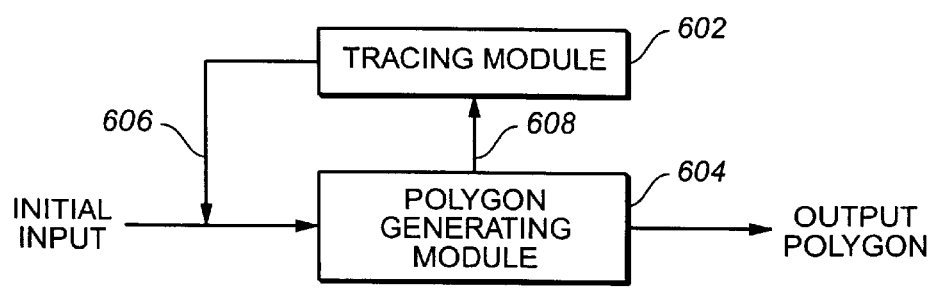
FIG._6

CONVERTING BITMAP OBJECTS TO POLYGONS

BACKGROUND

The invention relates to converting digital computer graphics involving the processing of raster and vector data.

In computer graphics, two basic forms of representation are used to define an image: raster and vector. In a raster representation, a bitmap specifies a set of pixel values at a set of raster positions to define an image. In this document, the term bitmap will include structures that have a bit depth greater than one in which pixels are defined by more than one bit of data; however, the bitmap will always be treated as binary, that is, each pixel position will be treated as being either on or off, image (foreground) or background. A bitmap generally has a rectangular structure. In a vector representation, resolution-independent vectors and their properties (such as fill pattern and color) define an image.

It is sometimes convenient or necessary to obtain a vector representation of one or more regions in a bitmap, for example to manipulate the shape of a bitmap region, to scale a bitmap region, to trap an object, or to clip a vector object against a bitmap mask. One method for obtaining a vector representation is to trace around the boundary of the bitmap object from pixel to pixel to create a closed contour, or polygon, corresponding to the bitmap object. However, such methods typically use the centers of traced pixels to generate the vertices of the polygon enclosing the region, and therefore can introduce as much as a half-pixel error in the conversion to a polygon. In many applications, this is an acceptable error. However, if a purpose of conversion is to use the polygon to clip another vector object, for example, and the polygon must be mapped to a new coordinate system, the half-pixel error can become several pixels in the new coordinate system. This several-pixel error may not be acceptable.

SUMMARY

In general, in one aspect, the invention provides methods, and apparatus implementing the methods, that provide useful resolution-independent representations of the perimeter of a bitmap object, that is, an object defined by pixels in a bitmap. In these methods, pixels are treated as having extent and edges that separate them from other pixels, and not as dimensionless points on a raster. In one implementation, the methods find the boundary pixels in a bitmap and identify each boundary pixel edge that actually contributes to the object perimeter. The contributing pixel edges will be one or more of the top, bottom, left, or right edges of the boundary pixels. Boundary pixels are non-object, or background, pixels that have one or more edges in common with object pixels. The methods distinguish objects that appear to share a common edge because they share boundary pixels, when in fact the objects are separated by a pixel width.

Implementations of the invention can include one or more of the following advantageous features. The polygon is encoded in a digital, compact, compressible format and stored on a computer-readable medium. The polygon is used to define traps in a vector-based trapping environment. The bitmap object has a hole and the invention provides a perimeter polygon enclosing the hole. Polygon edges are found using a finite state machine.

In general, in another aspect, the invention defines a polygon from a bitmap object by tracing around the bitmap; for each boundary pixel, identifying a pair of adjacent boundary pixels and determining the edges of the boundary pixel that contribute to the perimeter from the location of the pair of adjacent boundary pixels relative to the location of the boundary pixel; and accumulating the edges to define a polygon.

In general, in another aspect, the invention defines a polygon from a bitmap object by computing a sequence of direction codes based on tracing around a bitmap object; inputting sequentially each direction code to a finite state machine having a current state, each input causing the finite state machine to compute one or more edges of a polygon based on the current state and the direction code input, and each input causing the finite state machine to transition to a new state; and accumulating the identified object pixel edges to define the polygon.

In general, in another aspect, the invention generates a polygon from a bitmap object by tracing around the bitmap object along boundary pixels and generating a chain direction code for each boundary pixel, the chain direction code defining a direction from a current to a next boundary pixel around the bitmap object; using the chain direction codes generated, identifying the edges that contribute to the perimeter; and accumulating the identified perimeter edges to define a polygon corresponding to the perimeter of the bitmap object.

In general, in another aspect, the invention encodes a bitmap object by calculating a sequence of direction codes based on tracing around the bitmap object along the boundary, where each direction code represents a direction from an eight-connected pixel to an adjacent eight-connected pixel; inputting sequentially each direction code to a finite state machine having a current state, each input causing the finite state machine to calculate one or more boundary pixel edges that contribute to the perimeter based on the current state and the direction code input, and each input causing the finite state machine to transition to a new state; and storing the states to define a polygon.

In general, in another aspect, the invention provides a system, and a computer program, for converting a bitmap object to a polygon, the bitmap object having a boundary defining the perimeter of the bitmap object, where the system and program include a tracing module including instructions for causing a computer to trace around the boundary of the bitmap object and generate a plurality of chain direction codes where each chain direction code defines a direction from a boundary pixel to an adjacent boundary pixel; and a polygon generating module including instructions for causing the computer to identify for each boundary pixel one or more edges of the boundary pixel that contribute to the boundary based on two or more of the chain direction codes generated by the tracing module and to produce as output a polygon having an outline defined by the edges.

In general, in another aspect, the invention provides a system, a method, and a computer program implementing a technique for trapping mixed bitmap and vector objects in a vector-based trapping process. In the technique, the bitmap objects on a page (or a tile or band of a page) are converted to perimeter polygons, the polygons are planarized with the vector objects of the page (or tile or band), and the resulting planar structures are trapped.

In general, in another aspect, the invention provides a method of trapping an imagemask that includes identifying all of the perimeter edges of the imagemask; accumulating the identified perimeter edges to define a polygon; and defining traps for the polygon. The method can further include mapping the defined polygon to a device space, by applying an affine transform to one-unit vectors (X, 0) and (0, Y) in a two-dimensional coordinate system and for each identified perimeter edge, accumulating one or more of the transformed vectors based on the identified perimeter edge.

In general, in another aspect, the invention provides a method for printing a page that includes an imagemask. The method includes defining the imagemask as a polygon, including identifying all of the perimeter edges of the imagemask and accumulating the identified perimeter edges to define the polygon, a perimeter edge being a pixel edge contributing to the perimeter of the imagemask; mapping the polygon to device space; filling the polygon; and rendering the page using the filled polygon.

In general, in another aspect, the invention provides a method of trapping a bitmap object having a perimeter against a vector object in a vector-based trapping system. The method includes constructing a polygon congruent to the perimeter of the bitmap object, including identifying pixels in the object having one or more edges that contribute to the perimeter and accumulating the edges that contribute to the perimeter; and using the polygon to define vector-based traps for the object.

Advantages that may be seen in implementations of the invention include one or more of the following. The invention provides a precise vector representation of one or more regions in a bitmap that can be used to manipulate the shape of a bitmap region, to trap an object, or to clip a vector object against a bitmap mask. A list of vertices that enclose a bitmap object can be generated in image space, and upon rotation and/or scaling to device space, the polygon defined by these vertices will enclose exactly the same area that the bitmap object would enclose had the bitmap been mapped using the same transformation. A finite state automaton can be used to convert chain direction code representations to polygons, providing an efficient way to represent and generate polygons. The polygon can be generated from a list of state transitions starting from a known or initial state. The polygon can be encoded as a list of chain codes or state transitions, which can be used for bitmap compression or bitmap font representation. Each polygon segment can be encoded in a compact, compressible format, based on a limited number of possible segments that can be generated at any given state. The process of tracing around the bitmap object can be separated from the process of generating the polygon. Single pixel objects and one-pixel wide objects, as well as objects with interior holes, can be converted to vector representation.

Other features and advantages of the invention will become apparent from the following description and from the claims.

BRIEF DESCRIPTION OF THE DRAWINGS

FIGS. 1A and 1B are illustrations of objects in a bitmap including object, boundary, and background pixels.

FIGS. 2A through 2B are a flow chart of a method for converting a bitmap object to a polygon.

FIG. 3 is an illustration of a pixel with directional arrows corresponding to the eight chain directions to adjacent pixels.

FIG. 4 is a state-transition diagram for a finite state automaton performing bitmap-to-polygon conversion in accordance with the methods described.

FIG. 5 is a state table defining the function F(x, q) for the finite state automaton of FIG. 4.

FIG. 6 is a functional block diagram of modules for bitmap-to-polygon conversion.

DETAILED DESCRIPTION

FIGS. 1A and 1B show bitmap objects 102 and 104 (object 104 is defined to be all of the object pixels, or "on" pixels, in the bitmap) in a bitmap that includes object or foreground pixels 108, 116 that contribute to an object and background pixels 110, 118 that are not part of any object. The background pixels 110, 118 include boundary pixels 112, 120 at the boundary of bitmap objects 102 and 104, respectively. Each boundary pixel 112 has one or more edges 114 in common with an object pixel and contributing to the perimeter of the object.

As shown in FIGS. 2A and 2B, a process 202 implements methods in accordance with the invention for converting a bitmap object to one or more polygons in which the edges of pixels contributing to a perimeter of the bitmap (interior or exterior) object are identified and accumulated to produce a polygon that is identical to the perimeter of the bitmap object.

The process receives a bitmap object, such as object 102 of FIG. 1A (step 204). The process finds a starting boundary pixel on the perimeter of the object (step 206) and then traces around the boundary of the object by following the boundary pixels. At each boundary pixel, the process determines the direction to the next boundary pixel and what edges of the boundary pixel contribute to the perimeter of the object, as will now be described.

At step 208, the process attempts to locate a next boundary pixel adjacent to the current boundary pixel. As shown in FIG. 3, a pixel 300 has up to eight adjacent pixels in directions represented as numbers 0–7. These directions 0–7 will be called "chain direction codes". If the process finds an adjacent boundary pixel, the process stores a current chain direction code representing the direction to the adjacent boundary pixel (step 212). If no adjacent boundary pixel was found at step 210, the process stores a current chain direction code based on a predetermined function (step 214).

In step 216, the process determines, for the current boundary pixel, the edges that contribute to the perimeter of the object. The edges can be determined from chain direction codes, such as the previous chain direction (from the previous adjacent boundary pixel to the current boundary pixel) and the current chain direction (from the current boundary pixel to the next adjacent boundary pixel). The process encodes the contributing edges as digital data, such as data representing line segments or data representing vertices, stores the data (step 218), and marks the current boundary pixel as upward or downward traced (step 220) in order to ensure that each region is traced only once and to prevent the process from missing regions that are separated by only one pixel from other regions. Pixels are marked as "upward traced" or "downward traced" in step 220, according to the following rules: (1) if a pixel is already marked as downward traced, the process leaves it marked as such; (2) if the current chain direction is 1, 2, 3, or 4, the process marks the pixel as upward traced; (3) if the current chain direction is 5 or 6, then the process marks the pixel as downward traced; and (4) if the current chain direction is 0 or 7 then if the previous chain direction was 0 or 1 then the process marks the pixel as upward traced and otherwise the process marks the pixel as downward traced.

The process next determines whether there are any boundary pixels left to trace for the object (step 222). If there are no boundary pixels left to trace, tracing of the object is complete and the process creates as output a polygon from the stored data (step 226). If there are additional boundary pixels to trace (step 222), the process proceeds to consider the next adjacent boundary pixel (step 224) as defined by the current chain direction code. This pixel is now the "current" boundary pixel. The process then repeats the loop described above, returning to step 208 and attempting to locate the next adjacent boundary pixel from the current boundary pixel. The loop continues until there are no more boundary pixels to trace.

To select the starting boundary pixel (FIG. 2A, step 206) the process starts at the lower-right corner of the bitmap, and progresses from pixel to pixel, right to left and bottom row to top row, until it finds a pixel with a left-adjacent object pixel and a right-adjacent background pixel. This pixel is the starting boundary pixel. Before beginning, the process optionally adds a border of background pixels one or more pixels wide to the background in order to avoid special handling of pixels on the edge of the bitmap.

To locate the next adjacent boundary pixel (FIG. 2A, step 208) from the current boundary pixel, as the process traces around the boundary of the object, it stores a series of chain direction codes each indicating a direction from one boundary pixel to an adjacent boundary pixel. For each boundary pixel, a previous chain direction code indicates the direction taken to the boundary pixel. Based on the previous chain direction code, the process determines a sequence of three possible chain directions in which to search, in order, for the next adjacent boundary pixel. The directions are searched, and once an adjacent boundary pixel is found, the process sets the current chain direction code to be the chain direction to the next adjacent boundary pixel. If the process does not find an adjacent boundary pixel in any of the three directions, the process sets the current chain direction code to be a value determined by the previous chain direction code.

In one implementation now being described, the background pixels in the bitmap are eight-connected (meaning that a pixel is defined to have 8 neighboring pixels: one at each of its four edges and one at each of its four corners) and the object pixels are four-connected (meaning that a pixel is defined to have 4 neighboring pixels: one at each of its four edges). Tracing occurs around the eight-connected boundary (background) pixels in this implementation. In an alternative implementation, the object pixels can be eight-connected and the background pixels four-connected, and tracing can occur around eight-connected perimeter pixels, which are defined to be those object pixels having one or more edges contributing to the object's perimeter.

The process determines which edges of the boundary pixels contribute to the perimeter of the bitmap object (FIG. 2B, step 216) as follows. For each boundary pixel, the process identifies the contributing edges as a function of the previous chain direction code (identifying the direction taken to the boundary pixel from the previous adjacent boundary pixel) and the current chain direction code (identifying the direction to the next adjacent boundary pixel).

The function can be realized by a finite state automaton, or finite state machine, implementing the state-transition diagram 402 shown in FIG. 4. The finite state automaton generates a sequence of line segments $y_n=f(x_n, q_n)$ produced by a sequence of state changes. The output polygon is the connected union of the line segments $y_n$. Inputs to the automaton are $x_n$ and $q_n$. The input $x_n$ is defined as $x_n=C_i$, where $C_i$ is the current chain direction code (a number 0–7 as shown in FIG. 3). The input $q_n$ is defined as $q_n=(S, P)$, the current state of the automaton, where P is the previous chain direction code and S is a function of P, a "principal search direction" (0, 2, 4, or 6) defined for the purpose of representing the possible locations of the next adjacent boundary pixel consistently, discussed further below. The automaton has only eight states: one state for each of the eight different values of P (0–7) as shown in state-transition diagram 402 of FIG. 4.

The state of the automaton is updated as $q_{n+1}=g(x_n, q_n)$ where $g(x_n, q_n)$ is defined by the state-transition diagram 402 of FIG. 4. Given an input chain direction code $x_n=C_i$, the new state of the automaton $q_n=(S, P)$ is determined from the state-transition diagram 402 by following the directional arc corresponding to C from the current state to the new state. For example, if the current state 404 is (6,6) and the current chain direction 406 is C=7, then the new state 408 is (6,7). From each state, there are only four possible transitions because the number of possible chain directions to the next adjacent boundary pixel is limited by the tracing orientation and the physical characteristics of an object.

The principal search direction S can be used as a basis for representing the chain directions to search for the next adjacent boundary pixel. For example, in the conversion method implemented by the automaton, if the previous chain direction was 6 (referring to the directions shown in FIG. 3) then the chain direction to the next adjacent boundary pixel can only be 5, 6, or 7 (otherwise there is no continuous perimeter and no object). If the previous chain direction was 3, then the chain direction to the next adjacent boundary pixel can only be 1, 2, or 3. S is defined so that at each state, the process searches for the next adjacent boundary pixel in the chain directions S−1, S, and S+1, where the "−" operator defines rotating one "directional increment" clockwise around the pixel as shown in FIG. 3 (e.g. 0−1=7) and the "+" operator defines rotating in a counterclockwise direction (e.g. 7+1=0). The process assigns to the chain direction code C the chain direction to the next adjacent boundary pixel that was identified, the automaton transitions states according to state-transition diagram 402 of FIG. 4 and produces one or more line segments according to the function f(x, q) defined by the state table 502 FIG. 5, and the process traces to the next adjacent boundary pixel that was identified. If no next adjacent boundary pixel was found in any of the three directions searched, the process assigns to the chain direction code C the direction S+2, the automaton transitions states and produces line segments according to state-transition diagram 402 and state table 502, but the process does not trace to any adjacent boundary pixel. This allows the process to correctly determine the perimeter when the tracing path doubles back on itself on, for example, one-pixel wide holes.

The function f(x, q) which calculates the line segments is defined by the state table 502 of FIG. 5. That is, given inputs x=C and q=(S, P) as shown in table 502, the result of the function will be a number of one-pixel wide line segments in the X, −X, Y, or −Y coordinate directions. If pixels are not square, the interpretation and scaling of these four possible results is directly determined by the pixel shape. The automaton produces line segments with each state change, until the process has completed tracing the boundary of the object. The process then accumulates the line segments to form a polygon.

The functions of tracing around the boundary of the object and generating line segments corresponding to the contributing edges of the boundary pixels can be organized into modules 602 and 604 as shown in FIG. 6. Polygon generation module 604 includes a finite state automaton that is initialized with a starting state and accepts as input a current chain direction code 606. The input causes a state transition according to state-transition diagram 402 of FIG. 4, and polygon generation module 604 determines and accumulates the line segments corresponding to the state transition according to state table 502 of FIG. 5. Polygon generation module 604 outputs the (new) state 608 to tracing module 602. Tracing module 602 uses the state to determine a sequence of chain directions to search for the next adjacent boundary pixel. When tracing module 602 finds the next adjacent boundary pixel, it provides the corresponding chain direction code 606 to polygon generation module 604, which again generates line segments and makes a state transition. The process continues until the tracing module 602 has fully traced the boundary of the object. The polygon generation module 604 then outputs a polygon from the line segments it has generated.

For purposes of tracing the object, the bitmap is treated as binary (each pixel is either "on" or "off" or foreground and background) and the process considers the "object" to be the collection of all of the "on" pixels in the bitmap. The process can convert multiple regions in the bitmap, including regions with holes, to multiple polygons forming a single, compound path describing the object. On an output page defined using the Postscript® page description language ("PDL"), for example, the resulting path can be filled and the output will exactly match that generated using a one-bit image with Postscript® imagemask operator. Regions in the bitmap with interior holes can be represented by multiple polygons, the process creating a path which satisfies the even-odd filling rule as well as the zero-winding rule (although for scan line conversion, the even-odd rule may be easier to implement).

A polygon created from a bitmap object can be used for purposes of trapping the object, mapping the object to device space, clipping a vector object or performing other vector-space operations. An imagemask can be trapped in a vector space by defining a polygon from the imagemask according to the methods described herein, and then planarizing and trapping the polygon using vector-based trapping methods such as those described in commonly-owned U.S. patent application Ser. No. 08/810,491, entitled "Vector Map Planarization and Trapping", incorporated herein by reference, and using the planarizing techniques described in Vitto, "A Generic Solution to Polygon Clipping", Communications of the ACM, vol. 35, no. 7 (July 1992), pages 56–63.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results. The dual of the methods can be performed using the perimeter pixels (object pixels that share one or more edges with boundary pixels that are not part of the object), rather than using the boundary pixels that are not part of the object. The general orientation of tracing around the object can be clockwise or counterclockwise, and the method of finding a starting pixel can start with any pixel in the bitmap and proceed in any way that assures that all pixels in the bitmap will be visited. The pixels of the bitmap can have shapes other than square; for example, the shape can be a rectangle, rhombus, parallelogram, or other shape that can tile a surface. The polygon can be defined and stored as a set of edges defining the polygon or a set of vertices defining the polygon. The polygon edges can be accumulated and produced as the object is traced, or the chain direction codes or the states or state transitions can be stored in sequence and the polygon output based on the stored data at a later time. The polygon can be output and then mapped to device space by applying an affine transform to the polygon, or alternatively, the edges corresponding to the perimeter of the object can be defined initially as 2-dimensional, one-unit vectors in the directions (X, 0) and (0, Y), transformed, and the transformed vectors can be accumulated (instead of the perimeter edges) as the object is traced so that the output of the polygon generator is a polygon that can be rendered in device space. The methods can be performed on color as well as gray scale and black and white bitmaps.

What is claimed is:

1. A method for generating a polygon from a bitmap object defined by object pixels, each of the object pixels having edges shared with adjacent pixels, the method comprising:

identifying boundary pixels of the bitmap object, a boundary pixel being an object pixel that shares an edge with a non-object pixel or a non-object pixel that shares an edge with an object pixel;

for each identified boundary pixel, identifying all of the perimeter edge line segments, a perimeter edge line segment being an edge line segment that separates an object pixel from a non-object pixel;

accumulating the identified perimeter edge line segments to define a polygon; and using the polygon to define traps for the object.

2. A computer program tangibly stored on a computer-readable medium for converting a bitmap object to a polygon, the bitmap object having a boundary defining the perimeter of the bitmap object where the boundary includes one or more boundary pixels having one or more edge line segments shared with non-object pixels that contribute to the perimeter, the program comprising:

a tracing module including instructions for causing a computer to trace around the boundary of the bitmap object and generate a plurality of chain direction codes where each chain direction code defines a direction from a boundary pixel to an adjacent boundary pixel;

a polygon generating module including instructions for causing the computer to identify for each boundary pixel one or more edge line segments shared with non-object pixels that contribute to the perimeter based on two or more of the chain direction codes generated by the tracing module and to produce as output a polygon having an outline defined by the edge line segments; and a vector-based trapping module including instructions for causing the computer to define traps for the polygon.

3. A computer-implemented method of trapping a bitmap object, comprising:

identifying boundary pixels of the bitmap object, a boundary pixel being an object pixel that shares an edge with a non-object pixel or a non-object pixel that shares an edge with an object pixel;

for each identified boundary pixel, identifying all of the perimeter edge line segments of the bitmap object, a perimeter edge line segment being a line segment that separates adjacent pixels and contributes to the perimeter of the bitmap object;

accumulating the identified perimeter edge line segments to define a polygon; and defining traps for the polygon.

4. The method of claim 3, further comprising:

mapping the defined polygon to a device space, the mapping including applying an affine transform to one-unit vectors (X, 0) and (0, Y) in a two-dimensional coordinate system and for each identified perimeter edge line segment, accumulating one or more of the transformed vectors based on the identified perimeter edge line segments.

5. A computer-implemented method of trapping a bitmap object, the bitmap object having a boundary defining the perimeter of the bitmap object where the boundary includes one or more boundary pixels having one or more edge line segments that contribute to the perimeter, the method comprising:

defining a polygon from boundary pixels edge line segments that contribute to a perimeter of the object and accumulating the contributing edge line segments;

planarizing a page including the polygon and one or more other vector objects;

trapping the polygon against the other vector objects on the page.

6. A method for printing a page including a bitmap object, comprising:

defining the bitmap object as a polygon, including identifying boundary pixels of the bitmap object, a boundary pixel being an object pixel that shares an edge with a non-object pixel or a non-object pixel that shares an edge with an object pixel, and for each identified boundary pixel identifying all of the perimeter edge line segments of the bitmap object and accumulating the identified perimeter edge line segments to define the polygon, a perimeter edge line segment being a line segment separating the adjacent pixels and contributing to the perimeter of the bitmap object;

mapping the polygon to device space;

filling the polygon; and rendering the page using the filled polygon.

7. A method of trapping a bitmap object having a perimeter against a vector object in a vector-based trapping system, comprising:

constructing a polygon congruent to the perimeter of the bitmap object, including identifying pixels in the object having one or more edge line segments that contribute to the perimeter and accumulating the edge line segments that contribute to the perimeter; and using the polygon to define vector-based traps for the object.

8. A computer program product for printing a page including a bitmap object, the product comprising instructions operable to cause an instruction processor to:

receive a bitmap object;

define the bitmap object as a polygon by identifying boundary pixels of the bitmap object, a boundary pixel being an object pixel that shares an edge with a non-object pixel or a non-object pixel that shares an edge with an object pixel, and for each identified boundary pixel identifying all of the perimeter edge line segments of the bitmap object and accumulating the identified perimeter edge line segments to define the polygon, a perimeter edge line segment being a line segment separating adjacent pixels and contributing to the perimeter of the bitmap object;

map the polygon to device space;

fill the polygon; and render the page using the filled polygon.

9. The product of claim 8, further comprising instructions operable to:

receive a bitmap object having multiple regions, including regions with holes; and define the bitmap object as multiple polygons forming a single, compound path.

10. A computer program product for generating a polygon from a bitmap object defined by object pixels, each of the object pixels having edges shared with adjacent pixels, the product comprising instructions operable to cause an instruction processor to:

identifying boundary pixels of the bitmap object, a boundary pixel being an object pixel that shares an edge with a non-object pixel or a non-object pixel that shares an edge with an object pixel;

for each identified boundary pixel, identify all of the perimeter edge line segments, a perimeter edge line segment being an edge line segment that separates an object pixel from a non-object pixel;

accumulate the identified perimeter edge line segments to define a polygon; and use the polygon to define traps for the object.

11. The method of claim 1, wherein identifying all of the perimeter edges comprises:

selecting a starting boundary pixel;

tracing adjacent boundary pixels around the bitmap object and generating a chain direction code for each boundary pixel, the chain direction code defining a direction from a current to a next boundary pixel; and using chain direction codes to identify all edges that are perimeter edges.

12. The method of claim 11, wherein tracing around the bitmap object comprises:

searching for the next boundary pixel in a sequence of three or fewer directions derived from a previously generated chain direction code; and identifying the next boundary pixel and storing a current chain direction code defining a direction from the current boundary pixel to the next boundary pixel.

13. The method of claim 1, wherein accumulating the contributing edges to define an outline of a polygon includes combining adjacent co-linear edges to form a single, longer edge.

14. The method of claim 1, further comprising:

encoding the defined polygon in a digital, compact, compressible format; and storing the encoded polygon on a computer-readable medium.

15. The method of claim 1, wherein the bitmap object has an outer perimeter enclosing the bitmap object and an inner perimeter enclosing a background region within the outer perimeter.

16. The method of claim 1, wherein identifying all of the perimeter edges comprises:

inputting a current direction code to a finite state machine having a current state, the input causing the finite state machine to compute one or more perimeter edges based on the current state and the current direction code, and the current direction code causing the finite state machine to transition to a new state;

receiving as output from the finite state machine the new state; and determining a new direction code based on the new state.

17. The method of claim 1, wherein:

the object pixels are four-connected and the non-object pixels are eight-connected; and identifying the perimeter edges includes tracing non-object pixels each having a perimeter edge.

* * * * *

UNITED STATES PATENT AND TRADEMARK OFFICE
CERTIFICATE OF CORRECTION

PATENT NO. : 6,639,593 B1
DATED : October 28, 2003
INVENTOR(S) : Stephan R. Yhann It is certified that error appears in the above-identified patent and that said Letters Patent is hereby corrected as shown below:

<u>Column 10,</u>
Line 45, replace "identifying" with -- identify --.

Signed and Sealed this

Twelfth Day of October, 2004

JON W. DUDAS
*Director of the United States Patent and Trademark Office*